United States Patent [19]

Yuge et al.

[11] Patent Number: 5,350,777
[45] Date of Patent: Sep. 27, 1994

[54] PRODUCTION AND USE OF OPEN CELL RIGID POLYURETHANE FOAM

[75] Inventors: Kiyohiro Yuge, Yawata; Hitoshi Muramatsu, Tokyo; Yasuto Masuda, Shimamoto; Kazutaka Uekado; Yasuaki Tanimoto, both of Nishinomiya, all of Japan

[73] Assignees: Matsushita Refrigeration Company; Takeda Chemical Industries, Ltd., Japan

[21] Appl. No.: 95,214

[22] Filed: Jul. 23, 1993

[30] Foreign Application Priority Data

Jul. 27, 1992 [JP] Japan .................................. 4-199439
Oct. 8, 1992 [JP] Japan .................................. 4-270525

[51] Int. Cl.$^5$ ............................................. C08G 18/00
[52] U.S. Cl. .................................... 521/117; 521/118; 521/124; 521/131; 521/137; 521/159; 521/170; 521/174
[58] Field of Search ............... 521/117, 118, 124, 131, 521/137, 159, 170, 174

[56] References Cited

U.S. PATENT DOCUMENTS 4,814,360  3/1989  McBrayer .......................... 521/117

FOREIGN PATENT DOCUMENTS 0031207  7/1981  European Pat. Off. .
0339848  11/1989  European Pat. Off. .
0344537  12/1989  European Pat. Off. .
0415159  3/1991  European Pat. Off. .
9114732  10/1991  PCT Int'l Appl. .

*Primary Examiner*—Maurice J. Welsh
*Attorney, Agent, or Firm*—Wenderoth, Lind & Ponack

[57] ABSTRACT

A method of producing an open cell rigid polyurethane foam which comprises reacting a polyol with a polymethylene polyphenyl polyisocyanate prepolymer with a monool exemplified by diethylene glycol monomethyl ether by use of a substitute such as 1,1-dichloro-1-fluoroethane or methylene chloride as a volatile blowing agent, or a mixture of the volatile blowing agent with water, for trichlorofluoromethane as a blowing agent in the presence of a catalyst, a foam stabilizer and a cell opening agent. The resultant open cell rigid polyurethane foam has a cell size of about 200–250 microns, and is suitable for use, for example, as a core material in a vacuum heat insulating material. The foam may be enclosed in a container under a vacuum of 0.1–0.01 mmHg readily attainable to provide a vacuum heat insulating material of a high heat insulating performance.

20 Claims, No Drawings

PRODUCTION AND USE OF OPEN CELL RIGID POLYURETHANE FOAM

FIELD OF THE INVENTION

This invention relates to production and use of an open cell rigid polyurethane foam, and more particularly, to a method for the production of an open cell rigid polyurethane foam by use of a substitute for trichlorofluoromethane as a blowing agent, and use of such a foam as a heat insulating material.

BACKGROUND OF THE INVENTION

A closed cell rigid polyurethane foam is a good heat insulating material having excellent moldability and processability, and is in wide use as a heat insulating material in refrigerators, buildings, low temperature warehouses, storage tanks, refrigerator ships, or pipings. The rigid foam has been improved in thermal conductivity year by year, and has at present a value of 0.015 W/mK ( on a commercial basis. Thus, it is said that the rigid polyurethane foam has the smallest thermal conductivity of the heat insulating materials presently used around normal temperatures. Nevertheless, further reduction of thermal conductivity is increasingly demanded.

For the production of a closed cell rigid polyurethane foam, a one shot method is usually employed wherein an A component mainly composed of a polyol, a catalyst, a foam stabilizer and a blowing agent and a B component mainly composed of an organic polyisocyanate are mixed together so that the components react to carry out a foaming process and a curing process in parallel, thereby to form a foam.

Among the blowing agents used in the production of such a closed cell rigid polyurethane foam, trichlorofluoromethane or R-11 is well known. However, the conventional chlorofluorocarbons (CFC's) exemplified by R-11 are chemically stable so that they diffuse into the stratosphere to destroy the ozone layer. As results, the solar ultraviolet radiation is not absorbed by the ozone layer, but it reaches the surface of the earth, and is causing a global environmental problem. For this reason, the use of CFC's has been limited since 1989, and the use of R-11 for the production of polyurethane foam as well.

Under those circumstances, the investigation of a substitute as a new blowing agent for the conventional chlorofluorocarbons has been made, and for example, 1,1-dichloro1-fluoroethane (referred to as HCFC-141b hereinafter) or methylene chloride are put up as a candidate of a substitute for R-11.

However, in general, the heat conductivity of a heat insulating material composed of a closed cell rigid polyurethane foam can not be made smaller than that of a blowing agent used in the production of the foam, so that it is almost impossible to produce a closed cell rigid polyurethane foam having such a small heat conductivity as has been hitherto achieved if a substitute for R-11 must be used as a blowing agent.

Thus, a vacuum heat insulating material has been recently given attention again which is composed of a core material enclosed in a vacuum container of metal-plastic laminate film, as disclosed in Japanese Patent Application Laid-open No. 64-4112.

There are already known two kinds of core materials for use in vacuum heat insulating materials. One is an inorganic material such as perlite, and the other is an organic material such as an open cell polyurethane foam. The inorganic material is inferior in workability to the organic material, and in addition, it is of a high density and cost. On the other hand, an open cell rigid polyurethane foam is free from such problems as above involved in the use of inorganic core material. However, it is required that the open cell rigid polyurethane foam has ceils of very small size in order to retain such a low thermal conductivity as required over a long period of time, since when an open cell rigid polyurethane foam is used as a core material, the thermal conductivity of the resultant vacuum heat insulating material is largely dependent upon the cell size.

As the average cell size is taken as an average of major axis and minor axis of cells of foam, the conventional open cell rigid polyurethane foam has an average cell size of 300–1000 microns. Accordingly, it is necessary to make the inside of the foam reach to such a high level of vacuum of about 0.001 mmHg in order to obtain a high performance vaccum heat insulating material. However, it needs infeasibly much time to make such an open cell rigid polyurethane foam having an average cell size of about 300–1000 microns vacuous to such a high level of vacuum as above stated. Thus, it is necessary that an open cell rigid polyurethane foam has an average cell size of not more than 250 microns to reduce the influence of thermal conduction by gas sufficiently by making the inside of the foam vacuous at a readily attainable level of vacuum of 0.1–0.01 mmHg.

It is also an important requisite that the open cell rigid polyurethane foam has no closed cells. When the foam has the slightest amount of closed cells, the vacuum heat insulating material containing such a foam as a core material is greatly reduced in heat insulating performance if the material has an excellent heat insulation at the initial stage, since the blowing gas enclosed in the closed cells escapes from the cells gradually into the vacuum heat insulating material as time passes so that the pressure inside the vacuum heat insulating material rises accordingly.

For instance, presume that an open cell rigid polyurethane foam has a volume of 1800 cm$^3$ and closed cells in an amount of 2%, and that a vacuum heat insulating material is manufactured which has a thermal conductivity of about 5 mW/mK by making the inside of the foam reach to a level of vacuum of 0.001 mmHg. The resultant vacuum heat insulating material contains about 36 cm$^3$ of gas in the closed cells, and the gas gradually diffuses into the vacuous open cells against the diffusion resistance of cell walls of the closed cells, and accordingly the pressure inside the vacuum heat insulating material rises to a level of 15 mmHg, and the thermal conductivity is reduced to about 23 mW/mK or more.

If any, such closed cells are contained concentratedly in the skin layer of open cell rigid polyurethane foam. Thus, from the standpoint of raising the yield rate of products, it is necessary to produce a large block of foam, and make the rate of skin layer to the volume of the block as small as possible as the skin layer is removed from the block when it is put to use. However, the production of a large block of open cell rigid polyurethane foam is attended by a difficulty. Namely, while an open cell rigid polyurethane foam is formed, the resulting foam has a temperature as high as about 200° C. or more inside the foam, and the air readily penetrates deeply into the resultant foam where such a high internal temperature is reached, so that it usually takes place that the resultant open cell rigid polyurethane foam readily carbonizes. Thus, the resultant foam readily scorches.

BRIEF SUMMARY OF THE INVENTION

It is, therefore, an object of the invention to provide a method of producing an open cell rigid polyurethane foam, even a large size one with no scorching or burning, which has cells of much smaller size and hence a much smaller thermal conductivity than the conventional open cell rigid polyurethane foam.

The invention provides a method of producing an open cell rigid polyurethane foam which comprises reacting a polyol with a polymethylene polyphenyl polyisocyanate prepolymer with a monool by use of a substitute for trichlorofluoromethane as a blowing agent in the presence of a catalyst, a foam stabilizer and a cell opening agent.

DETAILED DESCRIPTION OF THE INVENTION

The polyol used in the invention may be any polyfunctional polyol which has been used in the production of conventional rigid polyurethane foam. Thus, the polyol used includes, for example, a polyether polyol which has a functionality of 2–8 and a hydroxyl value of 300–600 mg KOH/g and a polyester polyol which has a functionality of 2–4 and a hydroxyl value of 250–500 mg KOH/g. There may also be used a phenolic resin which has reactive methylols in the molecule.

Among those polyols mentioned as above is preferred a polyol having a hydroxyl value of 300–450 mg KOH/g, more particularly, a polyether polyol having a functionality of 2–8 and a hydroxyl value of 300–450 mg KOH/g. There may also be used a mixture of such a polyether polypol with a polyester polyol or a phenolic resin as mentioned above which has a hydroxyl value of 300–450 mg KOH/g on the average.

Most preferred is a polyether polyol which is obtained as an addition product of ethylene oxide or propylene oxide or both to one or a mixture of polyfunctional compounds containing active hydrogens therein such as a polyhydric alcohol, e.g., trimethylolpropane or sorbitol, or such as a polyfunctional amine compound, e.g., ethylenediamine, o-tolylenediamine or m-tolylenediamine, and which has a hydroxyl value of 300–450 mg KOH/g.

The polymethylene polyphenyl polyisocyanate prepolymer with a monool used in the invention is obtained by the reaction of a polymethylene polyphenyl polyisocyanate of the formula

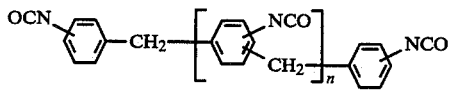

wherein n is an integer of 0–10, which is commercially available, with a monool or a monohydric alcohol, and has an amine equivalent preferably of 140–200.

The monool used in the production of prepolymer includes, for example, an alcohol such as methanol, ethanol, isopropanol, n-butanol, pentanol, hexanol, heptanol, octanol or phenylethyl alcohol; and a monoalkyl ether of (mono or poly)alkylene glycol such as ethylene glycol monomethyl ether, diethylene glycol monomethyl ether, triethylene glycol monomethyl ether, ethylene glycol monoethyl ether, diethylene glycol monoethyl ether, ethylene glycol monododecyl ether, ethylene glycol monoallyl ether, ethylene glycol monobenzyl ether, ethylene glycol mono-n-butyl ether, ethylene glycol mono-β-chloroethyl ether, ethylene glycol mono-n-hexyl ether, ethylene glycol monoisopropyl ether, ethylene glycol monophenyl ether, diethylene glycol monododecyl ether, diethylene glycol mono-β-chloroethyl ether, diethylene glycol monochlorohydrin, diethylene glycol mono-n-hexyl ether, diethylene glycol monoisobutyl ether, triethylene glycol monododecyl ether, triethylene glycol mono-n-butyl ether or triethylene glycol monochlorohydrin; and an addition product of alkylene oxides such as ethylene oxide, propylene oxide, butylene oxide or a mixture of these. The monool may be used singly or as a mixture.

If necessary, other polyisocyanates or their prepolymers such as tolylene diisocyanate or its prepolymer may be used together with the polymethylene polyphenyl polyisocyanate prepolymer.

It is preferred that the polymethylene polyphenyl polyisocyanate prepolymer is reacted with a polyol at an NCO/OH equivalent ratio or isocyanate index of 1.3 to 3.0, preferably in the range of 1.5–2.5.

The substitute for trichlorofluoromethane used as a blowing agent according to the invention is a volatile blowing agent or chemically inactive blowing agent which does not chemically participate in blowing or is not chemically involved in blowing. Such volatile blowing agents include, for instance, hydrochlorofluorocarbons or alkanes of preferably of one or two carbons in which some of hydrogens are replaced by chlorine and fluorine atoms and which are relatively readily decomposed; hydrofluorocarbons or alkanes of preferably of two to four carbons which have no chlorine atoms therein, but have some fluorine atoms in place of hydrogens; and perfluorocarbons or alkanes of preferably of four to six carbons wherein all the hydrogens are replaced by fluorine atoms.

The hydrochlorofluorocarbon may be exemplified by, for example, HCFC-141b, 1-chloro-1,1-difluoroethane or chlorodifluoromethane; the hydrofluorocarbon may be exemplified by, for example, 1,1,1,2-tetrafluoroethane, 1,1,2,2,3-pentafluoropropane (hereinafter referred to as CFC-245), 1,1,1,2,3,3-hexafluoropropane (hereinafter referred to as CFC-236) or 1,1,1,4,4,4-hexafluorobutane (hereinafter referred to as CFC-356); and the perfluorocarbon may be exemplified by, for example, perfluoropentane or perfluorohexane.

The substitute for trichlorofluoromethane used as a volatile blowing agent in the invention further includes, for example, any blowing agent as usually used as a substitute for R-11, such as methylene chloride, pentane, cyclopentane, chloropentane or carbon dioxide, as carbon dioxide is herein included in the volatile blowing agent for convenience.

A small amount of water, known as a chemical blowing agent which generates carbon dioxide by the reaction with the polyisocyanate, may be used together with the volatile blowing agent as mentioned above.

Among a variety of the blowing agents as above mentioned is preferred in particular HCFC-141b, a combination of HCFC-141b with water, or a combination of methylene chloride with water.

The amount of the blowing agent is suitably selected so as to provide an open cell rigid polyurethane foam having a density of 25–100 kg/m³. More specifically, the volatile blowing agent may be used usually in an amount in the range of 5-150 parts by weight in relation to 100 parts by weight of polyols used. When water is used together with the volatile blowing agent, the water may be used in an amount of 0.1-10 parts by Height, preferably 0.1-3 parts by weight, in relation to 100 parts by weight of polyol used.

The reaction of a polyol with a polymethylene polyphenyl polyisocyanate is effected in the presence of a catalyst, a foam stabilizer and a cell opening agent.

A known isocyanurating catalyst is preferably used, which includes, for example, an amine catalyst such as 2,4,6-tris(dimethylaminomethyl)phenol, triethylamine, N,N',N''-tris(dimethylaminopropyl)hexahydrotriazine, triethylenediamine, diazabicycloundecene or tetramethylhexanediamine; a carboxylic acid alkali metal salt such as potassium acetate, potassium benzoate, potassium 2-ethylhexanoate or potassium naphthenate; a strongly basic metal hydroxide such as potassium hydroxide, sodium hydroxide or calcium hydroxide; an alcholate or a phenolate such as potassium phenolate or sodium methoxide. The catalyst may be used singly or as a mixture.

The above catalyst may further be used together with a conventional catalyst used in the production of rigid polyurethane foams. The conventional catalyst may include, for example, a tertiary amine such as dimethylethanolamine, triethylenediamine, tetramethylethylenediamine, tetramethylpropylenediamine, tetramethylhexamethylenediamine or dimethylcyclohexylamine; an organometailic compound such as stannous octoate, dibutyltin dilaurate or lead octanoate; or a tertiary amine carboxylate.

The catalyst may be used in an amount of 0.01-20% by weight based on the amount of the polymethylene polyphenyl polyisocyanate prepolymer with a monool used.

The foam stabilizer used includes, for example, a silicone surfactant such as an organopolysiloxane, an organopolysiloxane-polyoxyalkylenecopolymer, a polyalkenylsiloxane having polyoxyalkylene side chains, and a fluorinated surfactant, a cationic, anionic or nonionic surfactant. The foam stabilizer may be used in an amount of 0.2-10% by weight based on the polyol used.

The cell opening agent used may be a known powdery divalent metal salt of a saturated carboxylic acid, preferably a fatty acid, such as calcium stearate, magnesium stearate, strontium stearate, zinc stearate or calcium myristate, as disclosed in Japanese Patent Application Laid-open No. 61-153480, or a powder of a thermoplastic resin such as polyethylene, as disclosed in Japanese Patent Application Laid-open No. 61-153478. The cell opening agent may be used in an amount of 0.1-20% by weight based on the polyol used.

The above mentioned raw materials are evenly mixed together by use of, for example, a high pressure foaming machine, to readily provide an open cell rigid polyurethane foam whose cell size is very small with no scorching or burning.

As above set forth, the method of the invention readily provides an open cell rigid polyurethane foam having a very small cell size and a very large block size with no undesirable scorching or burning by use of a polymethylene polyphenyl polyisocyanate prepolymer with a monool as a polyisocyanate together with such a substitute for R-11 as a blowing agent. Furthermore, the foam has a complete open cell structure.

According to the invention, as set forth above, a polyol is reacted with a polymethylene polyphenyl polyisocyanate prepolymer with a monool by use of a substitute for trichlorofluoromethane as a blowing agent in the presence of a catalyst, a foam stabilizer and a cell opening agent, to provide an open cell rigid polyurethane foam having a cell size as small as about 200-250 microns, and even a foam of a very large block size with no scorching attended. Thus, the open cell rigid polyurethane foam may be used advantageously as a core material in a vacuum heat insulating material. The foam may be enclosed in a container under a vacuum of 0.1-0.01 mmHg readily attainable to provide a vacuum heat insulating material of a high heat insulating performance.

The invention provides a method of producing an open cell rigid polyurethane foam which comprises reacting a polyol with a polymethylene polyphenyl polyisocyanate prepolymer with a monool by use of a substitute for trichlorofluoromethane as a blowing agent in the presence of a catalyst, a foam stabilizer and a cell opening agent.

The invention will now be described in more detail with reference to examples and reference examples, however, the invention is not limited thereto.

EXAMPLES 1 to 5

The materials used in these examples and reference examples 1-5 are as follows:

| | |
|---|---|
| Polyether polyol | Addition product of alkylene oxide to a mixture of tolylenediamine and value of 450 mg KOH/g |
| Catalyst | Potassium acetate |
| Foam stabilizer | Silicone surfactant (F-373 available from Shin-etsu Kagaku Kogyo K.K.) |
| Blowing agent A | R-11 |
| Blowing agent B | Water |
| Blowing agent C | HCFC-141b |
| Blowing agent D | Methylene chloride |
| Blowing agent E | HCFC-245 |
| Blowing agent F | HCFC-356 |
| Blowing agent G | Perfluoropentane |
| Cell opening agent | Calcium stearate |
| Polyisocyanate A | pMDI*) |
| Polyisocyanate B | Prepolymer obtained by the reaction of pMDI and bisphenol A, having an amine equivalent of 150 |
| Polyisocyanate C | Prepolymer obtained by the reaction of pMDI and bisphenol A, having an amine equivalent of 170 |
| Polyisocyante D | Prepolymer obtained by the reaction of pMDI and diethylene glycol monomethyl ether, having an amine equivalent of 170 |

*)pMDI: polymethylene polyphenyl polyisocyanate

The materials as indicated in Table 1 were mixed together at temperature of 25°±1° C. and reacted to form an open cell rigid polyurethane foam. The following day the resultant foam was cut to measure the cell size based on electromicrophotographs. The results are indicated in Table 1. The viscosity of polyisocyanate used at 25° C. is also indicated in Table 1.

The resultant rigid foam was heated for about two hours at 120° C. to remove moisture and unreacted materials therefrom, and was then enclosed in a laminate composed of metal and aluminum deposited polyester film/polyethylene film under a vacuum of 0.05 mmHg, thereby to provide a vacuum heat insulating material. The thermal conductivity of the vacuum heat insulating material is indicated in Table 1.

REFERENCE EXAMPLES 1-5

In the same manner as in the example 1, the reaction was effected. The results are indicated in Table 1.

The reference example 1 effected the reaction of polymethylene polyphenyl polyisocyanate with a polyol in the presence of R-11 as a blowing agent. The resultant open cell rigid foam was found to have an average cell size as large as 350 microns. The vacuum heat insulating material manufactured by use of the foam as a core material was found to have a thermal conductivity of $81 \times 10^{-4}$ W/mK.

It is necessary that an open cell rigid polyurethane foam has an average cell size of not more than 250 microns in order to obtain a practical vacuum heat insulating material having a thermal conductivity of not more than $64 \times 10^{-4}$ W/mK, preferably not more than $58 \times 10^{-4}$ W/mK.

In the reference example 2, a polymethylene polyphenyl polyisocyanate prepolymer with a hisphenol A (having an amine equivalent of 150) was used in place of polymethylene polyphenyl polyisocyanate, and the reaction was effected otherwise in the same manner as in the reference example 1. The resultant open cell rigid foam was found to have a reduced average cell size of 300 microns. The vacuum heat insulating material having the foam as a core material incorporated therein was also found to have a reduced thermal conductivity of $70 \times 10^{-4}$ W/mK, which was then found to be still unsatisfactory.

It would be expected that the use of a polyisocyanate having a higher amine equivalent provides an open cell rigid polyurethane foam having a smaller cell size. However, as noted from the reference example 3 wherein a polymethylene polyphenyl polyisocyanate prepolymer with a diol such as bisphenol A, the viscosity of the prepolymer used became larger as the amine equivalent became higher. For example, the prepolymer having an amine equivalent of 170 had a viscosity of 7000 Pas at 25° C. so that it could not be handled by a conventional high pressure foaming machine.

As further noted from the reference examples 4 and 5, the use of a polymethylene polyphenyl polyisocyanate prepolymer with a diol such as bisphenol A was found to fail to provide an open cell rigid polyurethane foam having a sufficiently small cell size and a thermal conductivity even if such a blowing agent as HCFC-141b or methylene chloride was used.

In contrast, the use of a polymethylene polyphenyl polyisocyanate prepolymer with monool according to the invention readily provided an open cell rigid polyurethane foam having an average cell size of about 200 microns by use of a conventional foaming machine since the prepolymer had a small viscosity. Furthermore, the use of the thus obtained open cell rigid polyurethane foam readily provided a vacuum heat insulating material having a thermal conductivity of $58 \times 10^{-4}$ W/mK.

EXAMPLES 6 TO 11

The materials used in these examples and reference examples 6-9 are as follows:

| | |
|---|---|
| Polyol A | Addition product of alkylene oxide to a mixture of tolylenediamine and ethylenediamine, having a hydroxyl value of 475 mg KOH/g |
| Polyol B | Addition product of alkylene oxide to a mixture of tolylenediamine and ethylenediamine, having a hydroxyl value of 450 mg KOH/g |
| Polyol C | Addition product of alkylene oxide to a mixture of tolylenediamine and ethylenediamine, having a hydroxyl value of 375 mg KOH/g |
| Polyol D | Addition product of alkylene oxide to a mixture of tolylenediamine and ethylenediamine, having a hydroxyl value of 300 mg KOH/g |
| Polyol E | Addition product of alkylene oxide to a mixture of tolylenediamine and ethylenediamine, having a hydroxyl value of 275 mg KOH/g |
| Catalyst | Potassium acetate |
| Foam stabilizer | Silicone surfactant (F-373 available from Shin-etsu Kagaku Kogyo K.K.) |
| Blowing agent | HCFC-141b |
| Cell opening agent | Calcium stearate |
| Polyisocyanate | Prepolymer obtained by the reaction of olymethylene polyphenyl polyisocyanate and diethylene glycol monomethyl ether, having an amine equivalent of 170 |

The materials as indicated in Table 2 were mixed together at temperature of $25° \pm 1°$ C. and reacted to form an open cell rigid polyurethane foam in a wooden box of 400 mm cube with use of high pressure foaming machine, while the internal temperature at the central part of the resultant foam was measured. After the internal temperature of the foam reached room temperature, the internal part of the foam was cut away to check if there took place scorching. The results are indicated in Table 2.

REFERENCE EXAMPLES 6 TO 9

In the same manner as in the examples 6-11, the reaction was effected using the materials indicated in Table 2. In some of the reference examples, the materials were foamed in a wooden box of 100 mm cube (i.e. block size of 100 mm cube) with use of high pressure foaming machine. The results are indicated in Table 2.

The reference example 6 effected the reaction of a polyol A having a hydroxyl value of 475 mg KOH/g at an NCO/OH equivalent ratio or isocyanate index of 1.0 in a wooden box of 100 mm cube. The resultant foam was found to have no scorching, however, since the reaction was effected at a small value of isocyanate index, the resultant foam was found to be insufficient in strength.

A rigid foam which has an insufficient strength as above mentioned is contracted and deformed when it is evacuated, to fail to provide a vacuum heat insulating material. A rigid foam for use as a core material in a vacuum heat insulating material is therefore required to have a sufficient strength.

The reference example 7 effected the reaction in the same manner as in the example 11 except that the resultant foam had a block size of 400 mm cube. The foam was found to be attended by scorching to some degree presumably because of a larger block size of foam and hence a larger amount of heat accumulated in the foam to accelerate carbonizing reaction in the foam.

However, as illustrated in the example 6, the use of polyol B having a hydroxyl value of 450 mg KOH/g at an isocyanate index of 2.0 provided a rigid foam of a block size of 400 mm cube, as in the case of the example 11. Accordingly, as will be clearly seen from the comparison of the examples 6 and 11 with the reference example 7, it is necessary to use a polyol having a hydroxyl value of not more than 450 mg KOH/g in order to produce a rigid foam of a large block size.

As further illustrated in the examples 7, 8 and 9, the use of polyol having a hydroxyl value of 375 mg KOH/g provided a rigid foam of excellent properties with no scorching either at an isocyanate index of 1.3 or 2.0 or 3.0. However, as indicated in the reference example 8, when the reaction was effected at an isocyanate index of 1.0, a rigid foam was obtained with no scorching, but the foam was of insufficient strength.

As will be apparent from the example 10, the use of polyol D having a hydroxyl value of 300 mg KOH/g provided a rigid foam of excellent properties. However, as seen in the reference example 9, when a polyol having a more reduced hydroxyl value (to a level of 275 mg KOH/g) was used, the heat generated was also reduced so that the resultant foam had no scorching, but had an insufficient strength as in the case of the reference example 8.

TABLE 1

|  | EXAMPLES |  |  |  |  | REFERENCE EXAMPLES |  |  |  |  |
|---|---|---|---|---|---|---|---|---|---|---|
|  | 1 | 2 | 3 | 4 | 5 | 1 | 2 | 3 | 4 | 5 |
| FORMULA (parts by weight) |  |  |  |  |  |  |  |  |  |  |
| Polyol | 100 | 100 | 100 | 100 | 100 | 100 | 100 | 100 | 100 | 100 |
| Catalyst | 1 | 1 | 1 | 1 | 1 | 1 | 1 | 1 | 1 | 1 |
| Foam stabilizer | 2 | 2 | 2 | 2 | 2 | 2 | 2 | 2 | 2 | 2 |
| Blowing agent A | 0 | 0 | 0 | 0 | 0 | 15 | 15 | 15 | 0 | 0 |
| Blowing agent B | 1.5 | 1.5 | 1.5 | 1.5 | 2.0 | 1.5 | 1.5 | 1.5 | 1.5 | 1.5 |
| Blowing agent C | 14 | 0 | 0 | 0 | 0 | 0 | 0 | 0 | 14 | 0 |
| Blowing agent D | 0 | 10 | 0 | 0 | 0 | 0 | 0 | 0 | 0 | 10 |
| Blowing agent E | 0 | 0 | 11 | 0 | 0 | 0 | 0 | 0 | 0 | 0 |
| Blowing agent F | 0 | 0 | 0 | 12 | 0 | 0 | 0 | 0 | 0 | 0 |
| Blowing agent G | 0 | 0 | 0 | 0 | 15 | 0 | 0 | 0 | 0 | 0 |
| Cell opening agent | 1 | 1 | 1 | 1 | 1 | 1 | 1 | 1 | 1 | 1 |
| Polyisocyanate A | 0 | 0 | 0 | 0 | 0 | 198 | 0 | 0 | 0 | 0 |
| Polyisocyanate B | 0 | 0 | 0 | 0 | 0 | 0 | 218 | 0 | 218 | 218 |
| Polyisocyanate C | 0 | 0 | 0 | 0 | 0 | 0 | 0 | 247 | 0 | 0 |
| Polyisocyanate D | 247 | 247 | 247 | 247 | 247 | 0 | 0 | 0 | 0 | 0 |
| PRODUCTION OF FOAM |  |  |  |  |  |  |  |  |  |  |
| Viscosity of Polyisocyanate (Pas) | 1000 | 1000 | 1000 | 1000 | 1000 | 200 | 1000 | 7000 | 1000 | 1000 |
| Isocyanate index | 1.5 | 1.5 | 1.5 | 1.5 | 1.5 | 1.5 | 1.5 | 1.5 | 1.5 | 1.5 |
| PROPERTIES OF FOAM |  |  |  |  |  |  |  |  |  |  |
| Cell size (micron) | 200 | 200 | 250 | 250 | 180 | 350 | 300 | — | 300 | 300 |
| Thermal conductivity ($\times 10^{-4}$ W/mK) | 58 | 58 | 58 | 64 | 52 | 81 | 70 | — | 70 | 70 |

TABLE 2

|  | EXAMPLES |  |  |  |  |  | REFERENCE EXAMPLES |  |  |  |
|---|---|---|---|---|---|---|---|---|---|---|
|  | 6 | 7 | 8 | 9 | 10 | 11 | 6 | 7 | 8 | 9 |
| FORMULA (parts by weight) |  |  |  |  |  |  |  |  |  |  |
| Polyol A | — | — | — | — | — | 100 | 100 | 100 | — | — |
| Polyol B | 100 | — | — | — | — | — | — | — | — | — |
| Polyol C | — | 100 | 100 | 100 | — | — | — | — | 100 | — |
| Polyol D | — | — | — | — | 100 | — | — | — | — | — |
| Polyol E | — | — | — | — | — | — | — | — | — | 100 |
| Catalyst | 1.3 | 0.9 | .1.2 | 1.6 | 1.0 | 1.4 | 0.9 | 1.4 | 0.8 | 0.9 |
| Foam stabilizer | 2 | 2 | 2 | 2 | 2 | 2 | 2 | 2 | 2 | 2 |
| Blowing agent | 43 | 29 | 38 | 51 | 33 | 45 | 29 | 45 | 25 | 31 |
| Cell opening agent | 1 | 1 | 1 | 1 | 1 | 1 | 1 | 1 | 1 | 1 |
| Polyisocyanate | 273 | 148 | 227 | 341 | 182 | 288 | 144 | 288 | 114 | 167 |
| PRODUCTION OF FOAM |  |  |  |  |  |  |  |  |  |  |
| Hydroxyl value (mg KOH/g) | 450 | 375 | 375 | 375 | 300 | 475 | 475 | 475 | 375 | 275 |
| Isocyanate index | 2.0 | .13 | 2.0 | 3.0 | 2.0 | 2.0 | 1.0 | 2.0 | 1.0 | 2.0 |
| Block size (mm cube) | 400 | 400 | 400 | 400 | 400 | 100 | 100 | 400 | 400 | 400 |
| Internal temperature (°C.) | 190 | 174 | 175 | 176 | 160 | 182 | 180 | — | 174 | 155 |
| PROPERTIES OF FOAM |  |  |  |  |  |  |  |  |  |  |
| Cell size (micron) | 200 | 250 | 200 | 250 | 200 | 200 | 250 | — | 250 | 200 |
| Thermal conductivity ($\times 10^{-4}$ W/mK) | 58 | 64 | 58 | 64 | 58 | 58 | — | — | — | — |
| Scorching | S* | No | No | No | No | S* | No | Yes | No | No |
| Strength of foam | Good | Good | Good | Good | Good | Good | Poor | — | Poor | Poor |

S*: Slightly

What is claimed Is:

1. A method of producing an open cell rigid polyurethane foam which comprises reacting a polyol with a prepolymer obtained by the reaction of a polymethylene polyphenyl polyisocyanate with a monool by use of a substitute for trichlorofluoromethane as a blowing agent in the presence of a catalyst, a foam stabilizer and a cell opening agent.

2. The method as claimed in claim 1 wherein the polyol is reacted with the polymethylene polyphenyl polyisocyanate prepolymer at an NCO/OH equivalent ratio of 1.3 to 3.0.

3. The method as claimed in claim 1 wherein the blowing agent is at least one volatile blowing agent which is selected from the group consisting of hydrochlorofluorocarbons of one or two carbons, hydrofluorocarbons of two to four carbons, perfluorocarbons of four to six carbons, methylene chloride, pentane, cyclopentane and chloropentane, or a mixture of the volatile blowing agent with water.

4. The method as claimed in claim 3 wherein the hydrochlorofluorocarbon is 1,1-dichloro-1-fluoroethane, 1-chloro-1,1-difluoroethane or chlorodifluoromethane.

5. The method as claimed in claim 3 wherein the hydrofluorocarbon is 1,1,1,2-tetrafluoroethane, 1,1,2,2,3-pentafluoropropane, 1,1,1,2,3,3-hexafluoropropane or 1,1,1,4,4,4-hexafluorobutane.

6. The method as claimed in claim 3 wherein the perfluorocarbon is perfluoropentane or perfluorohexane.

7. The method as claimed in claim 1 wherein the blowing agent is at least one of 1,1-dichloro-1-fluoroethane and methylene chloride, or a mixture of water and at least one of 1,1-dichloro-1-fluoroethane and methylene chloride.

8. The method as claimed in claim 1 wherein the blowing agent is used in an amount of 5–150 parts by weight in relation to 100 parts by weight of the polyol.

9. The method as claimed in claim 1 wherein the polyol is a polyether polyol having a functionality of 2 to 8 and a hydroxyl value of 300 to 600 mg KOH/g.

10. The method as claimed in claim 9 wherein the polyether polyol has a hydroxyl value of 300 to 450 mg KOH/g.

11. The method as claimed in claim 1 wherein the polyol is a polyester polyol having a functionality of 2 to 4 and a hydroxyl value of 250 to 500 mg KOH/g.

12. The method as claimed in claim 1 wherein the polymethylene polyphenyl polyisocyanate prepolymer with a monool has an amine equivalent of 140 to 200.

13. The method as claimed in claim 12 wherein the polymethylene polyphenyl polyisocyanate prepolymer with a monool is a polymethylene polyphenyl polyisocyanate prepolymer with diethylene glycol monoalkyl ether.

14. The method as claimed in claim 1 wherein a polymethylene polyphenyl polyisocyanate prepolymer with diethylene glycol monoalkyl ether is reacted with a polyether polyol having a hydroxyl value of 300 to 450 mg KOH/g at an NCO/OH equivalent ratio of 1.3 to 3.0 by use of at least one member selected from the group consisting of 1,1-dichloro-1-fluoroethane, 1,1,2,2,3-pentafluoropropane, 1,1,1,2,3,3-hexafluoropropane, perfluoropentane and methylenechloride, or a mixture of said at least one member and water.

15. The method as claimed in claim 1 wherein the cell opening agent is an alkaline earth metal salt or a zinc salt of a fatty acid, or a powder of thermoplastic resin.

16. The method as claimed in claim 15 wherein the alkaline earth metal salt of a fatty acid is calcium stearate.

17. An open cell rigid polyurethane foam produced by reacting a polyol with a polymethylene polyphenyl polyisocyanate prepolymer with a monool by use of a substitute for trichlorofluoromethane as a blowing agent in the presence of a catalyst, a foam stabilizer and a cell opening agent.

18. The open cell rigid polyurethane foam as claimed in claim 17 wherein the polyol is a polyether polyol having a hydroxyl value of 300 to 450 mg KOH/g, and the polyol is reacted with the prepolymer at an NCO/OH equivalent ratio of 1.3 to 3.0.

19. A vacuum heat insulating material which comprises an open cell rigid polyurethane foam enclosed in a metal-plastic laminate film under vacuum, the rigid foam being produced by reacting a polyol with a polymethylene polyphenyl polyisocyanate prepolymer with a monool by use of a substitute for trichlorofluoromethane as a blowing agent in the presence of a catalyst, a foam stabilizer and a cell opening agent.

20. The vacuum heat insulating material as claimed in claim 19 wherein the polyol is a polyether polyol having a hydroxyl value of 300 to 450 mg KOH/g, and the polyol is reacted with the prepolymer at an NCO/OH equivalent ratio of 1.3 to 3.0.

* * * * *